United States Patent
Spells, III et al.

(10) Patent No.: US 9,710,950 B2
(45) Date of Patent: Jul. 18, 2017

(54) EXTENSIBLE SPRITE SHEET GENERATION MECHANISM FOR DECLARATIVE DATA FORMATS AND ANIMATION SEQUENCE FORMATS

(75) Inventors: Henry David Spells, III, Sachse, TX (US); Peter W. Moody, Plano, TX (US)

(73) Assignee: Adobe Systems Incorporated, San Jose, CA (US)

( * ) Notice: Subject to any disclaimer, the term of this patent is extended or adjusted under 35 U.S.C. 154(b) by 1232 days.

(21) Appl. No.: 13/458,839

(22) Filed: Apr. 27, 2012

(65) Prior Publication Data

US 2013/0286025 A1  Oct. 31, 2013

(51) Int. Cl.
*G06T 13/20* (2011.01)
*G06T 13/80* (2011.01)

(52) U.S. Cl.
CPC .............. *G06T 13/20* (2013.01); *G06T 13/80* (2013.01); *G06T 2213/04* (2013.01); *G06T 2213/08* (2013.01)

(58) Field of Classification Search
CPC ................ G06T 13/00; G06T 13/80; G06T 2207/10016; G06T 2213/04; G06T 2213/08; G06K 15/00
See application file for complete search history.

(56) References Cited

U.S. PATENT DOCUMENTS

| | | | |
|---|---|---|---|
| 5,394,523 A | 2/1995 | Harris | |
| 7,747,946 B2 | 6/2010 | Nelson et al. | |
| 8,195,657 B1 * | 6/2012 | Dellovo | G06F 17/30702 707/733 |
| 2007/0174814 A1 | 7/2007 | Komissarchik et al. | |
| 2010/0229108 A1 * | 9/2010 | Gerson et al. | 715/757 |
| 2010/0285884 A1 * | 11/2010 | Gauer, III | A63F 13/10 463/42 |
| 2011/0113000 A1 * | 5/2011 | Marlow | G06F 17/30899 706/47 |
| 2012/0229473 A1 * | 9/2012 | Tam | G06T 13/80 345/473 |
| 2013/0036193 A1 * | 2/2013 | Padmanabhan | G06F 17/30876 709/217 |
| 2013/0278607 A1 * | 10/2013 | Twigg et al. | 345/473 |
| 2013/0335437 A1 * | 12/2013 | Lynn et al. | 345/589 |

(Continued)

OTHER PUBLICATIONS

Eppstein, compass-style, https://web.archive.org/web/20120305065309/http:/compass-style.org/help/tutorials/spriting, Mar. 5, 2012.*

(Continued)

*Primary Examiner* — Jeffrey Chow
(74) *Attorney, Agent, or Firm* — Shook, Hardy & Bacon, L.L.P.

(57) ABSTRACT

A sprite sheet generation mechanism includes providing a sprite sheet generation engine host, which may be an authoring application. The host loads code that describes sprite sheet format information and a set of ordered images into the sprite sheet generation engine. The code is from code resources may be plug-ins created by a user and managed by a plug-in type manager. The sprite sheet generation engine is operated using the sprite sheet format information and the set of ordered images to generate a sprite sheet.

19 Claims, 8 Drawing Sheets

(56) References Cited

U.S. PATENT DOCUMENTS

2014/0258849 A1* 9/2014 Chung .................. G06F 17/212
                                                                                          715/243

OTHER PUBLICATIONS

Vasco, Sprite Vortex, https://spritevortex.codeplex.com/documentation, Feb. 1, 2011.*
Welch, Texture-Atlas-Maker, http://www.codeproject.com/Articles/330742/Texture-Atlas-Maker, Apr. 1, 2012.*
"Extensible engine in XNA", Stack Exchange: Game Development, [Online]. Retrieved from the Internet: <URL: http://gamedev.stackexchange.com/questions/4903/extensible-engine-in-xna>, (Oct. 28, 2010), 1 pg.

* cited by examiner

RELATIONSHIP BETWEEN PLUG-INS AND THE PLUG-IN MANAGERS

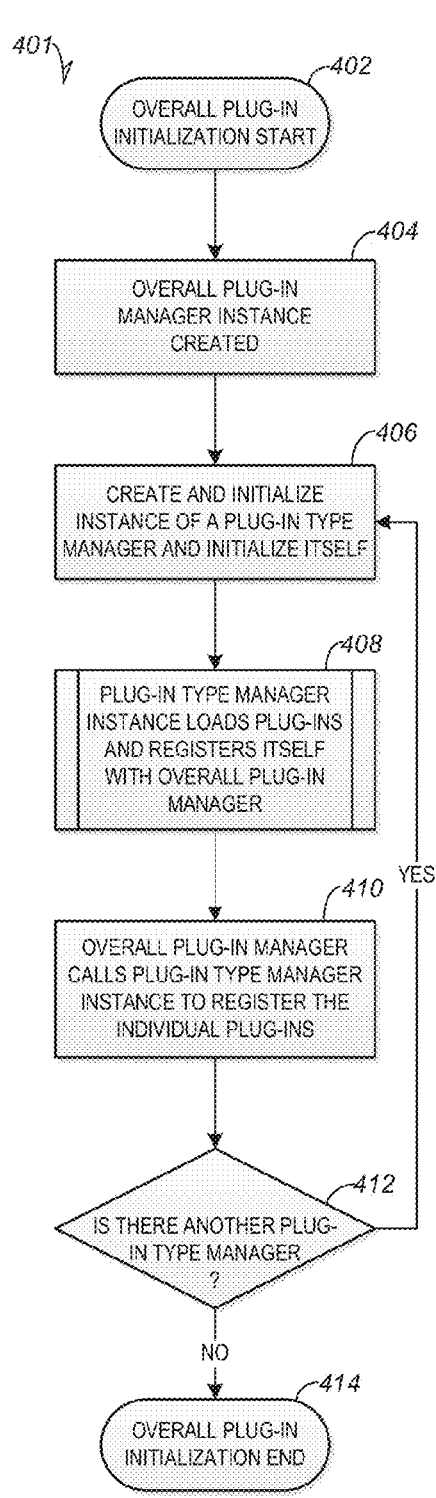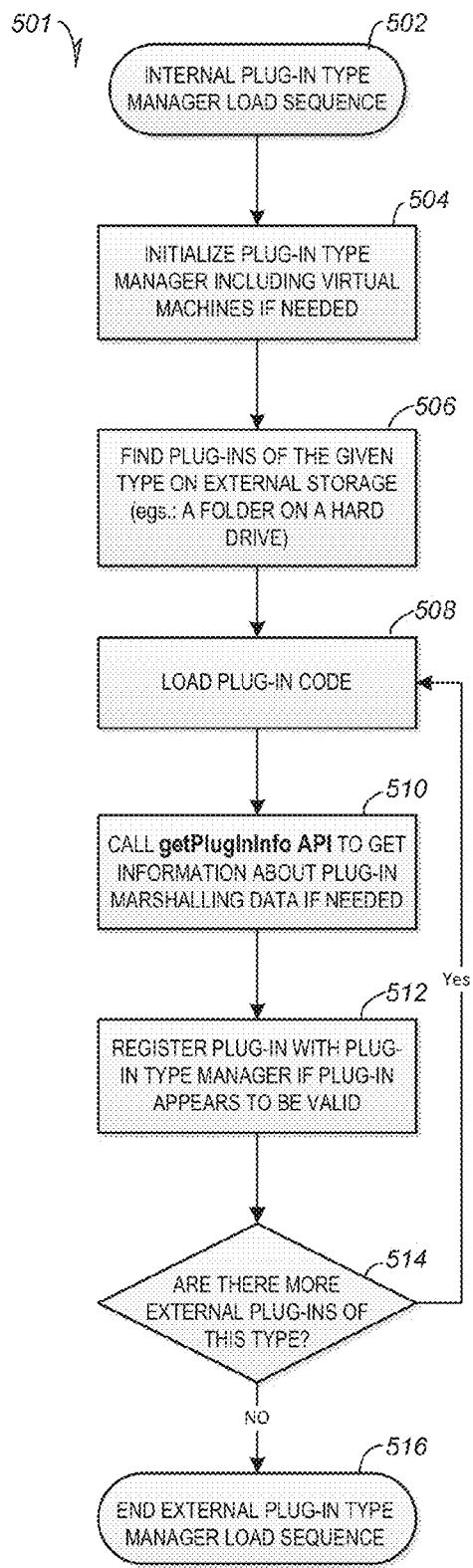
FIG. 4
FIG. 5

EXTENSIBLE SPRITE SHEET GENERATION MECHANISM FOR DECLARATIVE DATA FORMATS AND ANIMATION SEQUENCE FORMATS

TECHNICAL FIELD

The present application relates generally to the field of computer animation, web browsing, and digital publishing.

BACKGROUND

A sprite may be a transparent computer art graphic that can change position and move around a display screen while not affecting the background behind the graphic. A computer graphics sprite may be a two-dimensional or three-dimensional image or animation that is integrated into a larger scene. The sprite may include user adjustable dynamic visual elements. Some programming languages allow the creation of sophisticated interactive movies and allow a user to interact with the animation by manipulating sprites in the movie, triggering changes in the movie by clicking on a sprite, or even by opening a web site in a browser window. Often sprites are uploaded into a picture server in a desired format, for example as a transparent Portable Networks Graphic (PNG). The transparency aids in applying a background color using, for example, Cascading Style Sheets (CSS), as necessary to imply different states of the same image, for example, hover state, selected state. The user or developer could then point to each category using pixel co-ordinates as locations. Sprite sheet generation tools are becoming more common because game development for devices and the web is currently a big business and sprite sheets are used in a lot of game development engines. Examples of sprite sheet generation tools found on Internet are TexturePacker™, Zwoptex™ and SWFSheet.

In general a sprite sheet comprises two pieces. The first piece is a packed sequence of images that describes one or more animation sequences. Most game/animation sequence engines use common image formats like png, JPEG XR or a JPEG with a mask to import the image data. Extensible image format generation is known and does not need to be addressed in detail.

The second piece of a sprite sheet consists of one or more data files. The most common piece of information stored in these data files is a list of frames and the location of each frame (generally a pixel based bounding box) within the generated image. The most commonly used file formats used to store this information is xml, plist and JSON. This file may be called the sprite sheet frame layout file.

It is also becoming popular for game engines to have a file that describes various animation sequences within the sprite sheet image file. One way to describe these animation sequences is with a unique identifier and a list of frame numbers as described in the sprite sheet frame layout file. These files can be declarative or they can be a script or program. An example of this is easelJSm, a Javascript library, which uses a JavaScript program to declare a list of animation sequences that can be used by the developer in their game code.

There are a large number of public and proprietary game/animation sequence engines. Many of the engines use different file formats, have different capabilities and need more or less information in order to generate the necessary data files. Some of these file formats are proprietary and may be used only by the company that wrote the game engine. Sprite sheet generation tools often ship with a list of sprite sheet frame layout file format options that are considered important but do not output animation sequence descriptions. Nor do sprite sheet generation tools allow generation of other file formats than the ones that ship with the tool that involve packing the individual sprites into a sprite sheet image. There are plug-ins for GIMP™ and Photoshop® that allow creation of a sprite sheet image (i.e. use a favorite art program to create a sprite sheet image file). There are also programs like TexturePacker™ and Zwoptex™ that allow bringing in images and outputting a sprite sheet image and a variety of different sprite sheet layout file formats. These applications choose popular formats which, if not needed, require the user to write code to convert one format to another.

It would be helpful to have an application that addresses the issue of helping identify and quickly create animation sequence. An extensible sprite sheet generation mechanism would allow a user, sometimes referred to as a developer, or simply as a customer, to write a "plug-in" that describes either a declarative sprite sheet data format file and/or a program or animation sequence file. The developer of the sprite sheet generation engine may extend its capabilities without shipping a new engine.

BRIEF DESCRIPTION OF THE DRAWINGS

FIG. 4 is an illustration of a method of initialization of plug-in manager instances according to an example embodiment;

FIG. 5 is an illustration of a method of an external plug-in load sequence according to an example embodiment;

Figure 1:
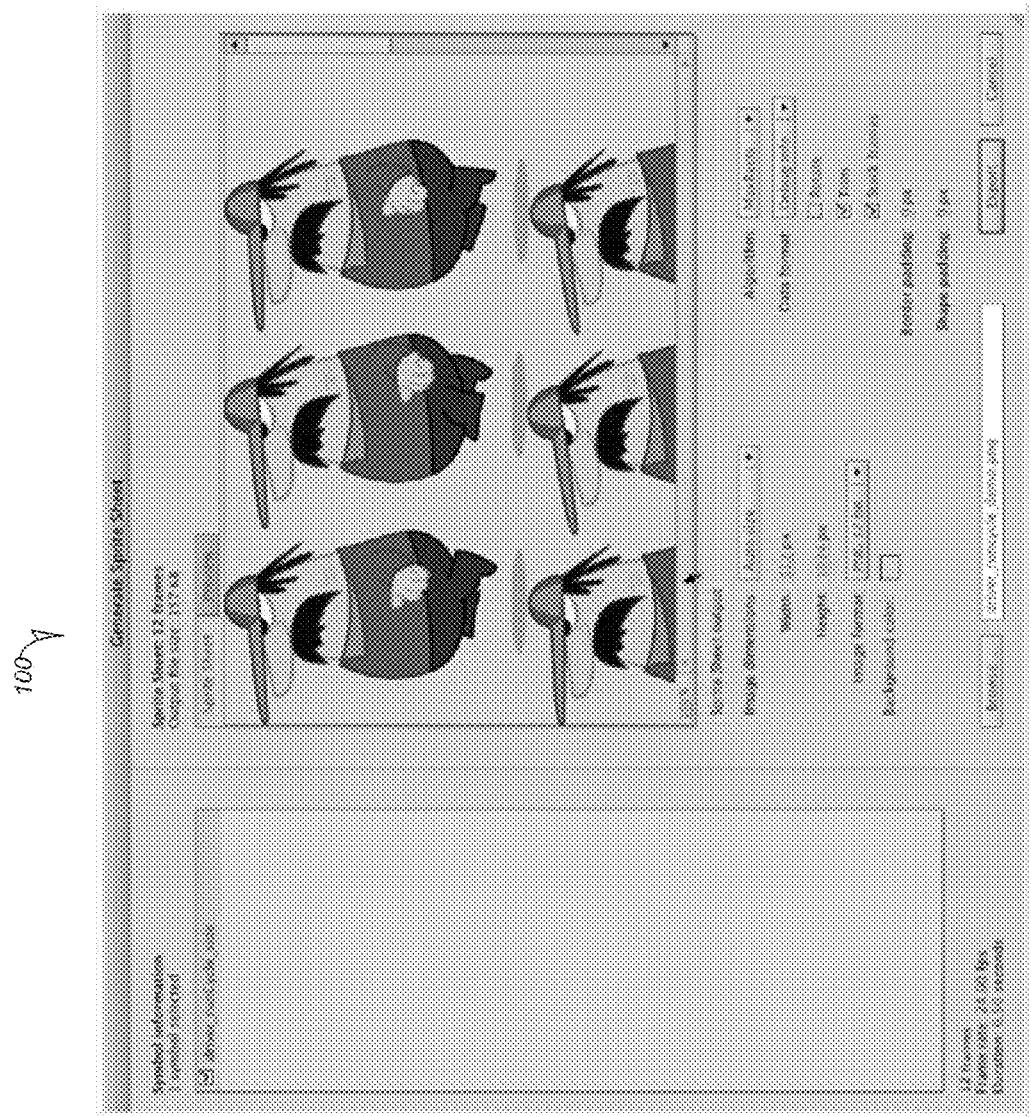
FIG. 1 is an illustration of a user interface that may be presented to a user according to an example embodiment.

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all other copyright rights whatsoever. The following notice applies to the drawing that forms a part of this document: Copyright© 2012 Adobe Systems Inc. All rights reserved.

DETAILED DESCRIPTION

As illustrated in the figures and describe below, various embodiments include one or more of systems, methods, and software to receive a selection of electronic files to import and place in a document as a contact sheet. The placing of images in some embodiments includes placing images at one time in response to input identifying an area and defining a size and spacing of where the images are to be placed. These embodiments, and others described herein, provide mechanisms that allow for rapid generation of contact sheet arrangements of electronic files, such as image files, within a document.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on computer readable medium such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Embodiments of the sprite sheet generation mechanism may have all or some of the following components:

(1) A way to describe animation sequences by ordering a list or sequence of images and assigning that list a unique identifier.
  (a) The capability to allow a customer to order a sequence of images and/or vectors that can be rasterized into an image on a time line. A video may qualify as a type of image sequence with an integral timeline. The time line can also be a vector based continuous timeline but the app should be able to generate a sequence of images usually a set time interval apart (like a video). In one embodiment the user may determine the output chronological order of the animation sequence, and therefore of the images.
  (b) The capability to put labels on individual items in the time line that represent the start of an animation sequence. This label may denote the start of the animation sequence.

(2) A plug-in architecture for a sprite sheet generation engine that may create a communication mechanism between the sprite sheet generation engine and one or more types of plug-ins.

(3) One or more plug-in types that may be loaded by the plug-in architecture. A plug-in type may be differentiated by the communication mechanism of the plug-in. Examples of plug-in types might be C/C++, JavaScript, Java, or Python (each requires a different communication mechanism to load/call). Each plug-in may have an API for the following:
  (a) An API to query the plug-in about itself; for example, the low chart of FIG. 5 calls this the getPluginInfo API, 510.
  (b) An API that is called before any frames are output; for example, the flow chart of FIG. 7 calls this the beginExport API, 714.
  (c) An API that is called for each frame; for example, the flow chart of FIG. 7 calls this the frameExport API, 718.
  (d) An API that is called after any frames are output; for example, the flow chart of FIG. 7 calls this the endExport API, 722.

(4) A process for the plug-in to save its state between calls. This may be simple as not unloading the plug-in.

(5) A process for the plug-in to be called multiple times for multiple files/outputs.

(6) A process to initiate the sprite sheet generation process (such as a menu item from a user interface).

(7) A process to choose which plug-in will be used to export the Sprite Sheet (such as a popup menu or list menu to choose from in a dialog or panel).

(8) A process to adapt the user choices in the user interface (UI) and/or the output based on the capabilities of the plug-in. Examples of this may include disabling certain UI items, changing the packing parameters for the image and or limiting the output image types. Information that exceeds a minimum threshold may be sent to the plug-in to enable it to generate not only simple declarative file formats but also animation sequences and actual programs and/scripts.

In respect of capabilities, different sprite sheet data formats may support different features or "capabilities" in the plug-in information. A common (and non-exhaustive) list of features may include:
  a) The ability to rotate individual frames in the animation so that it can fit into a smaller space in the overall sprite sheet image (i.e. packed tighter);
  b) The ability to trim off empty space around the edges of the frame so that it can "pack tighter;"
  c) The ability to stack duplicate frames (for example, in the same image) on top of each other to "pack tighter" while still maintaining all the animation sequence data in the output;
  d) The ability to add a border of empty space around the entire image to help some sprite sheet frameworks when the copy individual bitmaps from the big sprite sheet to the output screen/bitmap;
  e) The ability to add a border of empty space around the individual frame images to help some sprite sheet frameworks when the copy individual bitmaps from the big sprite sheet to the output screen/bitmap.

A non-exhaustive list of factors that may be important when presenting the user with choices and when outputting the file may include;
  aa) Each plug-in may have its own capabilities;
  bb) The user may or may not want to use the capabilities even if they exist in the plug-in;
  cc) The final output conforms to the actual capabilities of the plug-in.

For example, and with reference to FIG. 1, there is seen UI 100 with, in one embodiment, the following UI elements:
  1) A checkbox marked "Rotate;"
  2) A checkbox labeled "Trim;"
  3) A checkbox labeled "Stack Frames;"

4) An editable text field labeled "Border padding;"

5) An editable text field labeled "Shape padding."

The above fields in FIG. 1 are enabled/disabled in UI 100 presented to the customer or user based upon the values returned by the getPluginInfo API in the capabilities object, as discussed in more detail below with respect to the disclosed flow charts. This provides a communication mechanism from the plug-in to the app and then to the customer in the form of UI choices to help guide the customer in the creation of the sprite sheet. This "app" may be whatever application is hosting the sprite sheet generator engine. In one embodiment this may refer to Flash Professional® available from Adobe Systems, Inc. However, it could be just a simple app that loads the plug-ins, takes a sequence of images, an animation description and a list of parameters and then calls one of the plug-ins to generate the sprite sheet. A capabilities object may be used in the context of a plug-in, communicating between a plug-in and the calling application. For instance, if "canRotate" in the capabilities object is "false" then the "Rotate" checkbox may be turned off and disabled so that the user cannot generate an "invalid" sprite sheet image (i.e. one that the targeted sprite sheet framework cannot handle). The foregoing is an example of a UI that allows the user to interact with the software.

Figure 2A:
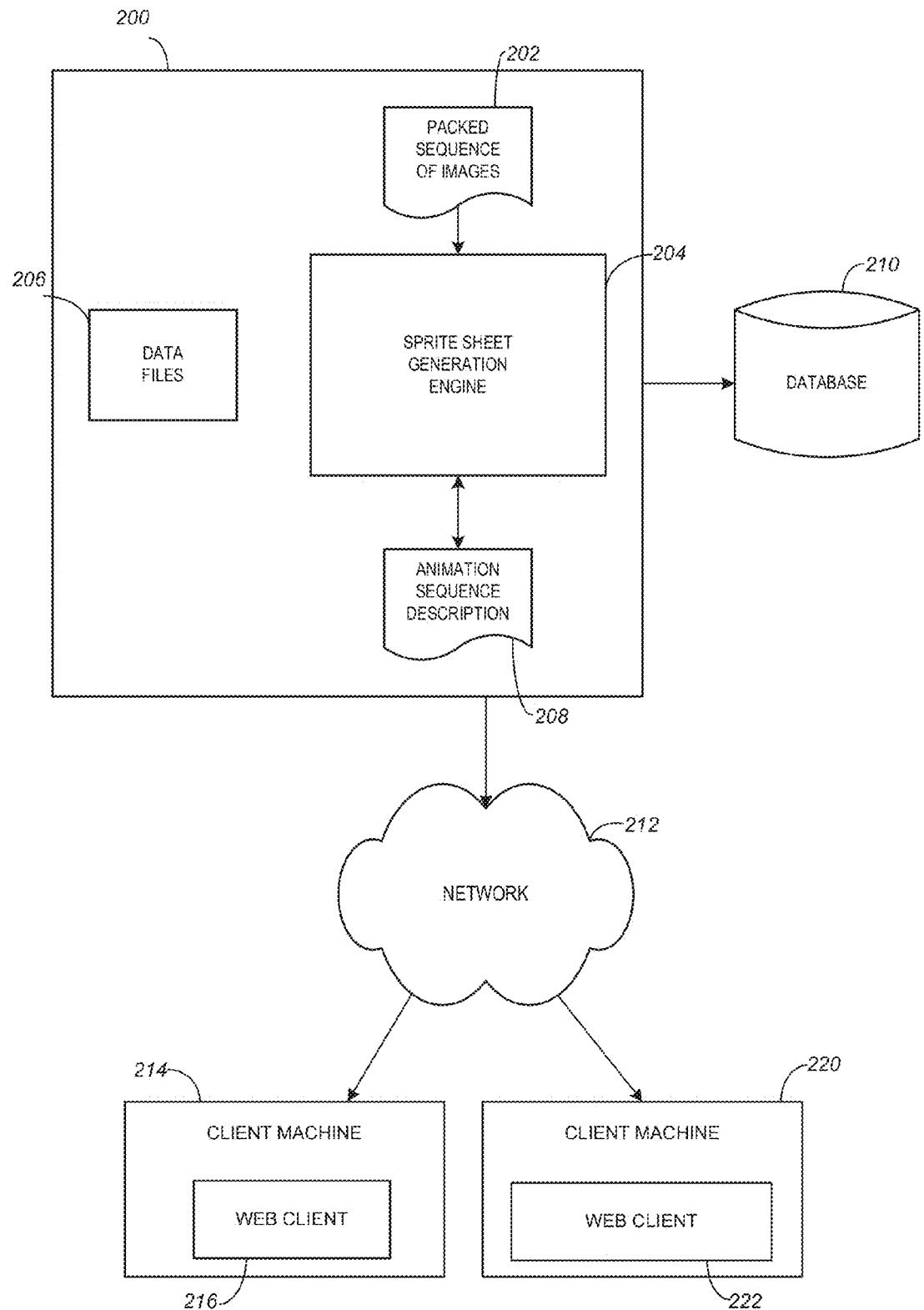
FIG. 2A is an illustration of a high level system block diagram of a sprite sheet generation mechanism according to an example embodiment.

Turning now to FIG. 2A is an illustration of a high level system block diagram of a sprite sheet generation mechanism (e.g., host)according to an example embodiment. Some embodiments may include a document authoring application such as the Adobe® InDesign® application available from Adobe Systems, Incorporated of San Jose, Calif. Other embodiments may include a document authoring such as Adobe Flash Authoring® application also available from Adobe Systems, Incorporated. Further, the authoring application may be a word processing application, a web page authoring application, a presentation application, or other application within which a user may desire to import electronic files, such as images, for placement as a contact sheet.

The embodiment of the sprite sheet generation mechanism of FIG. 2A is seen generally at 200 and comprises packed sequence of images 202, data files 206 and sprite sheet generation engine 204 having as an output an animation sequence description 208. Input to sprite sheet generation mechanism 200 may be provided from database 210. The animation sequence description may be executed to be displayed over network 212, which may be the Internet, to client machines 214, 220.

Figure 2B:
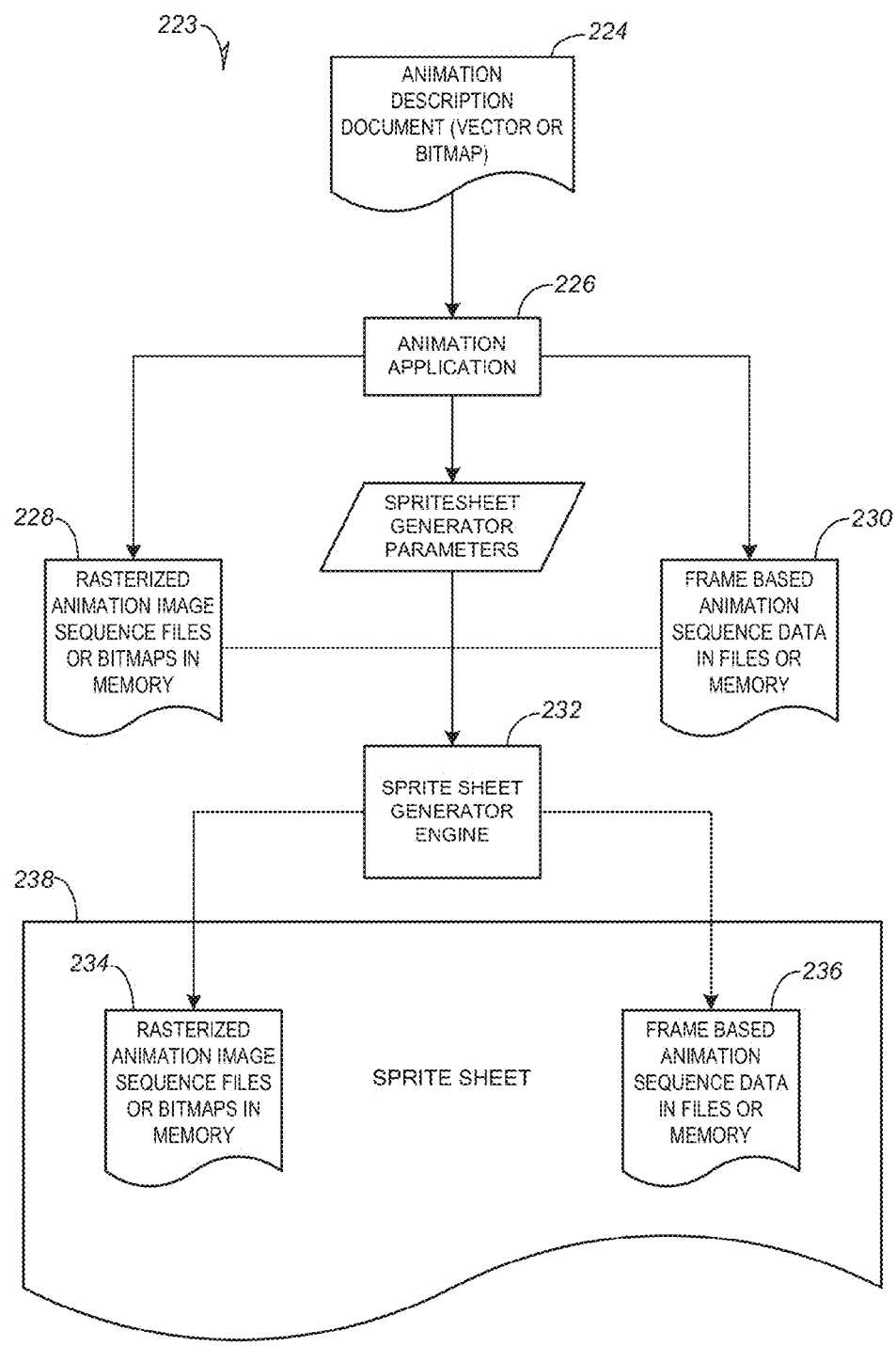
FIG. 2B is an illustration of another system block diagram according to an example embodiment.

FIG. 2B is an illustration of another embodiment 223 of a sprite sheet generation mechanism an animation description document, which may be in vector or bitmap format, is connected to animation application 226 which may be considered a sprite sheet generator host application and may be referred to as such herein. The host is executable by a computer processor and storage and is capable of finding and/or creating, and then sending, images, animation sequence information and/or sprite sheet generation parameters. In some embodiments the host may be Flash Authoring available from Adobe Systems. It is possible for the sprite sheet generation operation to be performed in a server side application with no UI and just a list of parameters. However, in the case of Flash Authoring this operation is done on the client side. The sprite sheet generator host application 226 in one embodiment provides outputs 228 which are rasterized animation image sequence files or bitmaps which may be stored in memory. Output 230 is a frame based animation sequence data, also stored in memory. Again, it is possible to do this in a server side application with no UI and just a list of parameters. However, in the case of Flash Authoring this is done on the client side. Outputs 228, 230 are provided as inputs to sprite sheet generator engine 232. Once again, it is possible to do this in a server side application with no UI and just a list of parameters. However, in the case of Flash Authoring this is done on the client side. The sprite sheet generator engine provides as outputs sprite sheet image sequence file 234 and sprite sheet animation sequence description file 236. In operation, the image sequences files 228 and sprite sheet data 230 may also be generated from other information such as vector and cell animation data 224 and passed in memory directly to the sprite sheet generator engine 232. The path could be, for example, that animation description document 224 may reside in a database and is sent to sprite sheet generator host application 226 which then may automatically generate sprite data and image, that is, animation sequence data 230 and animation image sequence files 228, which are then provided to a sprite sheet generator engine 232. For every image file or bitmap in memory 234 there may be corresponding animation sequence data file/memory data 236. This pair of files/memory data corresponds to a set of one or more animation sequences and constitutes a sprite sheet such as 238 relating to items 234 and 236. This sprite sheet 238 is normally used as input for a sprite sheet framework or a game engine that uses sprite sheets. A programmer may write code describing where to get the sprite sheet data from (like the URI of the file or the API that will grab the memory data) and under what conditions to display each animation sequence described in the sprite sheet. However, describing the full intended use of the generated sprite sheet is beyond the scope of this patent.

Flow Charts

Several terms will be used below and are discussed here in a non-limiting sense. That is, the use of and meaning of such terms may be contracted or expanded by one of ordinary skill in the art in implementing various embodiments without departing from the spirit herein.

A capabilities object may be used in the embodiments discussed below, and may include the following common properties: 1) Can sprites be trimmed (i.e. eliminate empty pixels)? 2) Can sprites be rotated (for better fit)? 3) Can sprites be padded (i.e. empty pixels around each shape)? 4) Can the sprite sheet be padded (i.e. empty pixels around the entire sprite sheet)? 5) Prefers pre-multiplied alpha in the sprite sheet image.

As further discussed below, the user can initiate a "Sprite Sheet Generation/Export" operation using an appropriate user interface (e.g., menu item).

The application may provide a capabilities-aware (from "getPluginInfo" callback) user interface for gathering user specified data such as "Export Sprite Sheet UI"). The application may also call the plug-in instance in the specified sequence with the user-gathered data to generate the sprite sheet. Note that for each frame permutated with each file format that the "frameExport" API may be called for the following (as a non-limiting example): 1) open the various files or output streams for write access; 2) call the "beginExport" API with parameters as noted below as one example. The "beginExport" API may either return the data that it wants written out to the file or alternatively a stream API can be passed into the "beginExport" API and the API can call the stream API to output the data. 3) For each frame in the sprite sheet iterate through each file format specified by the "getPluginInfo" API. 4) For each file format specified by the "getPluginfo" API call the "frameExport" API. The "frameExport" API may return or output data in a similar fashion to beginExport API. 5) Call the "endExport" API (See beginExport/endExport API parameters). The "endExport" API should return or output data in a similar fashion to beginExport API. 6) Flush and close all files.beginExport/endExport API parameters. The above examples are capabilities of the game/animation engine that consumes the sprite sheet.

Possible metadata and sprite sheet wide data may include: 1) Name of generating application; 2) Version number of the generating application; 3) URL or file path to the image file; 4) Image format (example RGBA8888); 5) Width and height of the sprite sheet image; 6) Scale of the sprite sheet image; 7) File format identifier (used when outputting multiple files) frameExport API parameters.

An example of a plug-in that that users should be able to write is seen below. The embodiment empowers the user to dynamically add plug-ins that can output files that work with a framework that may not even be known about at present. The user already has some widely used formats available to them and so that they can see how they might create their own. A set of reasonably well known concepts may be combined in a way to solve a real customer need. The combination of concepts used include 1) sprite sheet generator 2) a plug-in manager 3) plug-ins with an API that matches the calling sequence of the plug-in manager 4) and a way for the customer to write a plug-in (documentation and/or examples).

Figure 3:
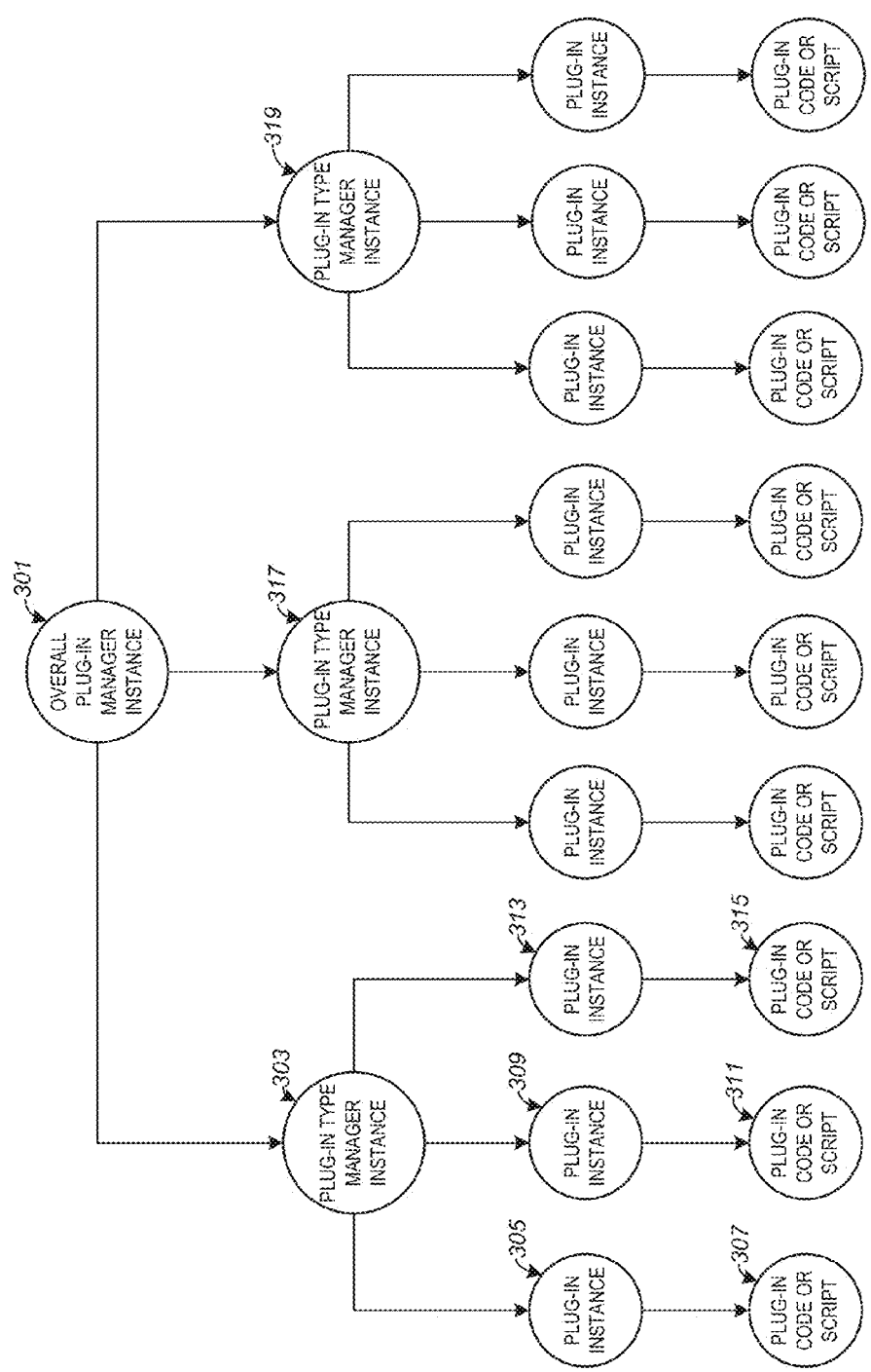
FIG. 3 is an illustration of a relationship between plug-in instances and plug-in manager instances according to an example embodiment.
Figure 6:
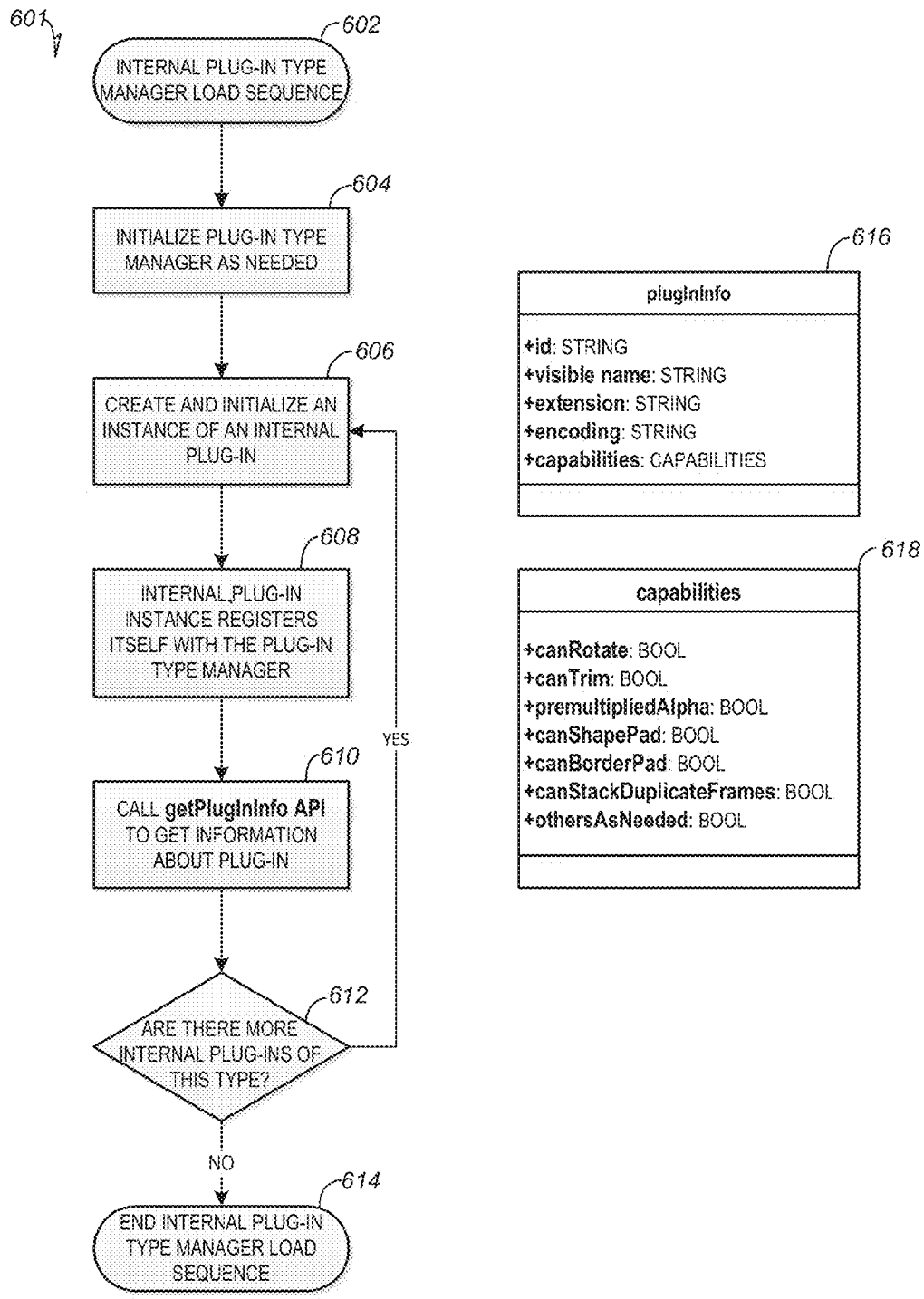
FIG. 6 is an illustration of a method of an internal plug-in load sequence according to an example embodiment.

FIGS. 4, 5, and 6 illustrate interplay between and/or among the overall plug-in manager instance, one or more plug-in type manager instances, and the one or more plug-in instances. Turning first to FIG. 3 there is seen a relationship between plug-in instances and the plug-in manager instances. There is an instance of an overall plug-in manager 301 which may manage one or more plug-in type manager instances. FIG. 3 shows three instances of plug-in type mangers although those of ordinary skill in the art will recognize that the number of plug-in type manager instances may be fewer than or more than three. As one example, plug-in type manager instance 303 manages a plug-in instance 305 that has plug-in code or script as illustrated at 307. Plug-in type manager instance 303 may also manage other plug-in instances such as 309 with its code or script 311, and 313 with its code or script 315. Plug-in type manager instances 317 and 319 may be similar to plug-in-type manager instance 303.

Turning now to FIG. 4, there is seen an overall plug-in manager initialization process 401 which begins at 402. An overall plug-in manager may be viewed as the manager of other plug-in managers, each of which may load its own plug-ins. There may be a plug-in instance for each plug-in loaded. For example, in one embodiment each plug-in instance may be added to an object that can map the plug-in ID to the instance of the plug-in. At 404, an instance of the overall plug-in manager may be created. At 406, a plug-in type manager instance may be created and initialized and will find or be informed of plug-ins of its associated type. Initializing the plug-in type manager may depend upon the type of plug-in type being loaded and the style of the programmer. The plug-in type might just initialize a few variables and/or allocate some memory. The point is that the plug-in type manager is given an opportunity to get ready to load the plug-ins. The code may initialize a few variables and then proceed to load the plug-ins at 408 of FIG. 4 which corresponds to items 502-516 of FIG. 5. In another embodiment the individual plug-ins may not be loaded during initialization.

A plug-in type manager load sequence may include a single instance of the plug-in type manager being created and finding the plug-ins of its associated type. Typically these are located on a specified folder/directory of a hard drive and can be loaded after initialization of a virtual machine and/or communication mechanism. At 408 the plug-in type manager instance created at 406 may load plug-ins of its associated type and registers itself with the overall plug-in manager. There are multiple ways that a plug-in type manager could be found or registered with the overall plug-in type manager. The overall plug-in manager could look for code resources at a particular URI, then load each plug-in type manager code resource individually and then call an initialization API on the loaded code resource. In Flash Professional the plug-in type managers register themselves with the overall plug-in manager by calling an API (called "AddDataLayoutPlugin" in Flash Professional) on the overall plug-in manager and then the overall plug-in manager immediately calls back to the plug-in type manager to iterate through a register the individual plug-ins. This may be seen in 410 of FIG. 4 in the flow chart description. In one embodiment the method may iterate through the list of plug-ins on the individual plug-in type manager by calling the "GetNumOfPluginTypes" and then for the individual plug-in may call "GetPluginTypeInfo" on the plug-in type manager and then call "AddDataLayoutPluginType" on the overall plug-in manager passing in the information passed by from the "GetPluginTypeInfo" API. This is just one possible implementation of the registration process.

At 410 the overall plug-in manager may call the plug-in type manager instance to load its plug-ins. A decision is taken at 412 to determine whether there is another plug-in type manager that has not registered and loaded its plug-ins. If yes, the method proceeds back to 406 and the method repeats for the new plug-in type manager. If not, then the overall plug-in manager initialization ends at 414.

FIG. 5 illustrates an external plug-in type manager load sequence 501. Items 616 and 618 of FIG. 6 provide one example of the type of information that "getPluginInfo" should return. This involves plug-in instance data. An object that contains the following possible properties/members may be returned by the call to "getPlugInInfo". 1) A unique id for the plug-in. This unique identifier may be used by the sprite generator engine host application to lookup the plug-in to call when it comes time to generate the sprite sheet. 2) The visible name. If a UI is presented to the user that allows the user to choose which type of sprite sheet to generate then this name could be used in the UI as a description of the sprite sheet that will be generated. Examples of these sprite sheet type in Flash Professional are "Starling", "easeljs", "JSON", etc. . . . 3) The file extension and or data type of the output file to be created. Examples 'xml' for "Starling", 'js' for "easeljs" and 'json' for "JSON". 4) The encoding of the output file to be created. Common encodings might include "uft8", "utf16" and "binary" 5) A capabilities object 618 that lists the supported capabilities of the data format/animation engine. In one embodiment, the method begins at 502. At 504 the external plug-in type manager, including virtual machines if needed, may be initialized. Scripted language plug-ins are usually easier for the customer or user to write than compiled languages plug-ins. Most scripted language plug-ins use a virtual machine to load and execute scripts and for data marshaling between a non-scripted sprite sheet generator host application and the plug-in scripts. Assuming that the sprite sheet generator host application is not written in the same script as the plug-ins then the virtual machine for the given scripting language may need to be loaded and initialized. In Flash Professional a JavaScript based virtual machine may be used to load and execute the plug-ins.

The external plug-in type manager may manage plug-ins of the given type on external storage at 506 and load the plug-in code at 508. Flash Professional may load the plug-ins from the hard drive. However, it would be possible to load the same plug-ins from given location on a website. An example of this might be a node.js server that hosts a sprite generator engine. At 510 the plug-in manager may call the getPlugininfo API to get information about plug-in marshaling data if needed. Data marshaling in general is defined at http://en.wikipedia.org/wiki/Marshalling_(computer-_science). In the case of Flash Authoring this may be implemented by making a procedure call from a C++ to JavaScript. The in memory representation of C++ data types are different than the in memory representation of the corresponding JavaScript data types. The process of converting the data from the C++ data types to the JavaScript data types and back is commonly referred to as "data marshaling". At 512 the plug-in may be registered with the plug-in type manager if the plug-in appears to be valid. There are a number of reasons why a plug-in type manager may deem a plug-in to be invalid. If a required-unique id in the plug-in is not unique (i.e. another plug-in is also using this id) then the plug-in may be deemed to be invalid. If the plug-in is written in a scripting then it is possible for the script to get a compile error when loading or being jit'ed. This would certainly invalidate the plug-in. Depending upon the plug-in type the writer of the plug-in type may determine what conditions would invalidate a plug-in. A decision is taken at 514 to determine whether there may be more external plug-ins of the given type. If yes, the method repeats beginning at 506. If not, the method ends at 516.

Turning to FIG. 6, there is illustrated at 601 an internal plug-in type manager instance load sequence according to one embodiment, beginning at 602. A plug-in type manager may be loaded from an external code resource, dll, shared library, through a remote procedure call to SOAP call, etc. . . . An internal plug-in type manager may have the plug-in type manager code inside the sprite sheet generator engine host application. Flash Professional's JavaScript plug-in type manager is internal to Flash Professional even though the individual plug-ins may be located in an individual .js file that are external to the application. The internal plug-in type manager may be initialized as needed at 604. In this case every plug-in type manager may have its own initialization sequence based on its' needs (i.e. as needed). Some may require a lot of initialization (like initializing a virtual machine in the case of scripted languages) or very little initialization if all the code is internal to the sprite sheet generator engine host application. An instance of an internal plug-in may be created and initialized at 606. The internal plug-in instance may register itself with the plug-in type manager at 608, and at 610 the internal plug-in manager calls the getPlugininfo API to get information about the plug-in. If it is determined at 612 that there may be more internal plug-ins of the current type then the method repeats for the next internal plug-in. If not, the method ends at 614.

The above method generally discusses parameters/information flowing between the sprite sheet generator and the sprite sheet plug-in. A Unified Modeling Language (UML) pluginInfo diagram 616 indicates possible information that may be returned by the plug-in from the getPluginInfo API. The capabilities UML diagram 618 identifies properties of the capabilities object that is noted in the last line of the "pluginInfo" UML diagram. Types are included on the data to denote what they usually would be.

Figure 7:
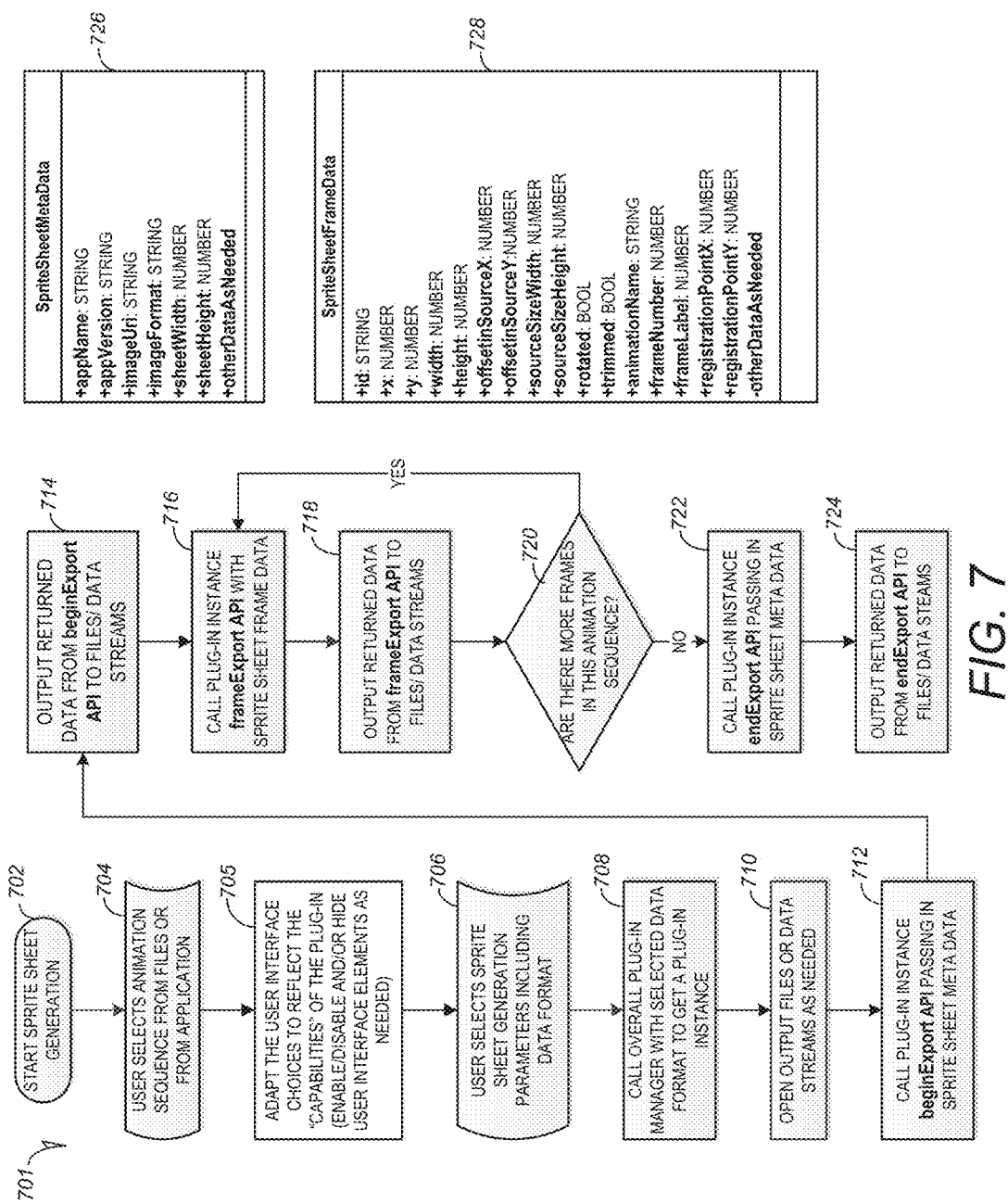
FIG. 7 is an illustration of a method of sprite sheet generation according to an example embodiment.

FIG. 7 is an illustration of a method 701 of sprite sheet generation according to an embodiment. For purposes of the present discussion, a frame may be considered the combination of 1) a raster image and 2) any information about its position needed to draw that image as part of animation sequence. The method begins at 702. At 704 the user may select animation sequence from the files or from the sprite sheet generator host application 226 discussed above with respect to FIG. 2B. This may typically be performed inside 226 (by sprite sheet generator host application 226). At 705 the system may adapt the user interface selection to reflect the capabilities of the plug-in. This may also be performed inside, or by, sprite sheet generator host application 226 This is discussed above as, in one embodiment, enabling/disabling and/or hiding the UI elements as needed. At 706 the user may select sprite sheet generation parameters including a data format. This may be performed by or inside sprite sheet generator host application 226. At 708 the overall plug-in manager may be called with the selected data format to get a plug-in instance. In one embodiment the sprite sheet generator host application 226 may call the overall plug-in manager with the "ID" 616 of the plug-in and the overall plug-in manager returns an instance of the individual plug-in. At 710 the output files or data streams may be opened as needed. The location of the output files or data streams can be user specified through the UI of the sprite sheet generator host application 226 or it can be predetermined by the sprite sheet generator host application 226 and communicated to the user. At 712 the plug-in instance beginExport API may be called passing in the sprite sheet meta-data. The returned data from the beginExportAPI may be output to the files or data streams, as the case may be, at 714. At 716 the plug-in instance frameExport API with sprite sheet frame data may be called from the sprite sheet generator host application 226 and at 718 the returned data from the frameExport API of the plug-in code to the frameExport API of the plug-instance (illustrated generally in FIG. 3) is output to the files or data streams as the case may be. A decision is taken at 720 to determine whether there are more frames to be processed in the current animation sequence. If yes, then the process repeats at 716. If not, then the process may call plug-in instance endExport API for passing sprite sheet meta-data in. At 724 the data returned from endExport API may be output to the files or data streams. The SpriteSheetMetaData UML diagram 726 describes possible information that could be sent to the plug-in in the beginExport API and endExport API. The SpriteSheetFrameData UML diagram 728 describes possible information that could be sent to the plug-in in the frameExport API. In an alternate embodiment, the plug-in may control the file/data stream output instead of calling the sprite sheet generator host application 226 of FIG. 2A.

At this point the sprite sheet file or data stream can be used to draw animations in the designated sprite sheet animation engine or gaming framework.

Figure 8:
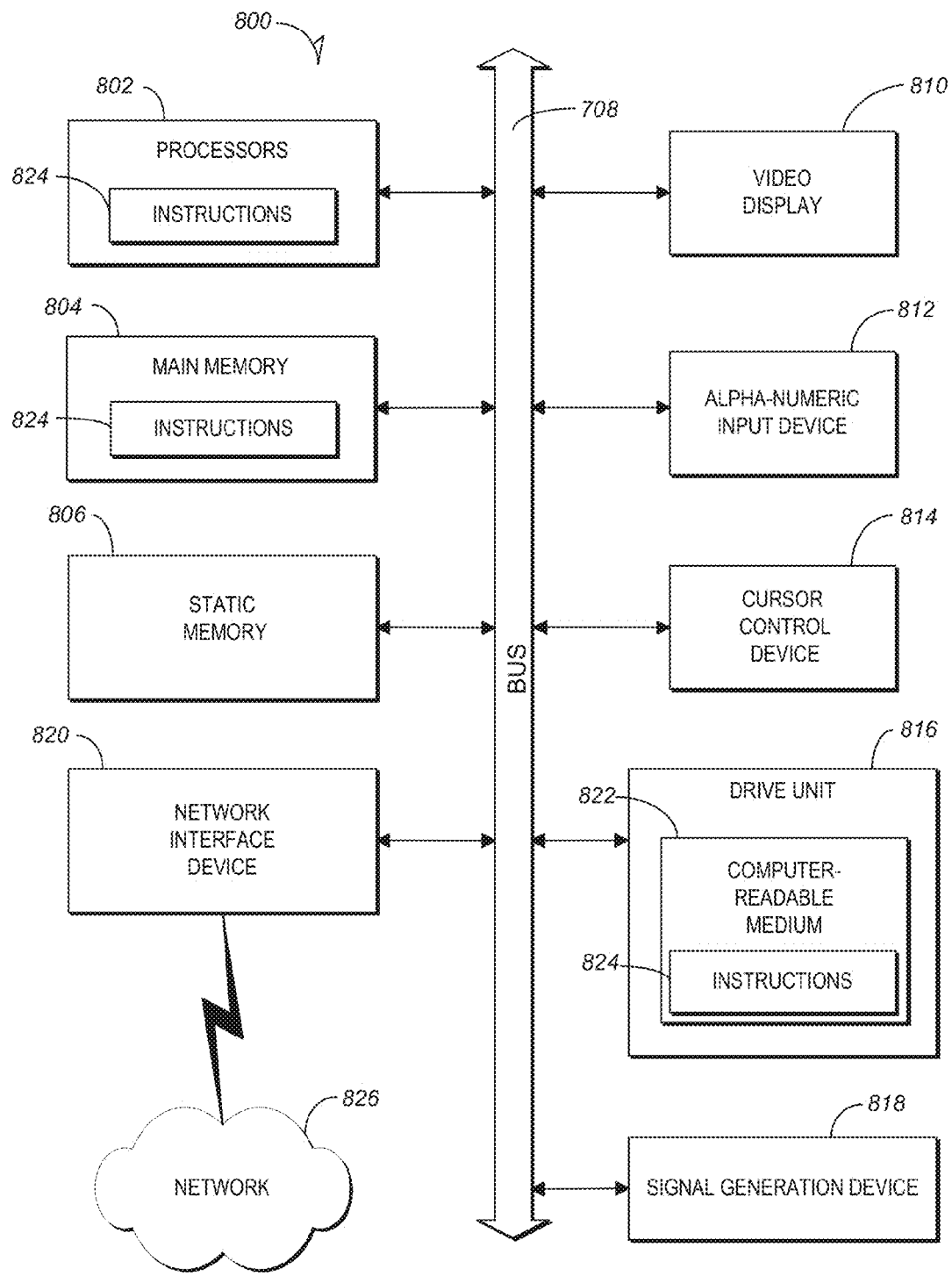
FIG. 8 is a block diagram of a computing device according to an example embodiment.

FIG. 8 is a block diagram of a computing device according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 800, may include a processing unit 802, memory 804, 806, removable storage 822, and non-removable storage 806. Memory may include volatile memory 804 and non-volatile memory 806. Computer 800 may include—or have access to a computing environment that includes—a variety of computer-readable media, such as volatile memory 804 and non-volatile memory 806, removable storage 822 and non-removable storage. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 800 may include or have access to a computing environment that includes input, output, and a communication connection 708. The input may include or be coupled to a keyboard 812 and a gesturing device such as a mouse. The output may include or be coupled to a signal generation device 818 (e.g., monitor), printer, and other output devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), the Internet, or other networks.

Computer-readable instructions 824 stored on a computer-readable medium 822 are executable by the processing unit 802 of the computer 800. A hard drive, CD-ROM, and RAM are some examples of articles including a computer-readable medium. The computer-readable instructions may include a computer program including instructions 824 such as a document authoring application as discussed above.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

Driver Runcycle Demo.debug
-(beginExport method start)
meta.autoSize=(true)
meta.sheetWidth=(512)
meta.sheetHeight=(1024)
meta.algorithm=(basic)
meta.shapePadding=(0)
meta.borderPadding=(0)
meta.allowRotate=(false)
meta.allowTrimming=(false)
meta.stackDuplicateFrames=(false)
meta.layoutFormat=(debug.plugin)
meta.canShapePad=(true)
meta.canBorderPad=(true)
meta.canRotate=(false)
meta.canTrim=(true)
meta.canStackDuplicateFrames=(true)
meta.overflowed=(false)
meta.app=(Adobe Flash CS6)
meta.version=(12.0.0.481)
meta.image=(driver_runcycle_demo.png)
meta.format=(RGBA8888)
*(beginExport method end)
-(frameExport method start)
1) A unique frame identifier created by the application.
frame.id=(driver_runCycle_side0000)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name.
This might be a string like (egs. DiscoDancer,Äù).
frame.symbolName=(driver_runCycle_side)
8) The current frame number.
frame.frameNumber=(0)
2) The location of the sprite within the sprite sheet image includes the x and y pixel offset as well as the width and height.
frame.frame.x=(0)
frame.frame.y=(0)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0001)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name. This might be a string like (egs. DiscoDancer,Äù).
frame.symbolName=(driver_runCycle_side)
8) The current frame number.
frame.frameNumber=(1)

2) The location of the sprite within the sprite sheet image includes the x and y pixel offset as well as the width and height.
frame.frame.x=(161)
frame.frame.y=(0)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0002)
frame.symbol=([object SymbolItem])
9) The name/label of the current frame in the animation sequence (egs. 'Jump', 'Walk', 'Dance', etc, Ä¶).
frame.symbol.timeline.layers[0].frames[frame.frameNumber].name=(WalkCycle)
7) The name of the animation sequence. This is sometimes called the symbol name.
This might be a string like (egs. DiscoDancer,Äù).
frame.symbolName=(driver_runCycle_side)
8) The current frame number.
frame.frameNumber=(2)
2) The location of the sprite within the sprite sheet image includes the x and y pixel offset as well as the width and height.
frame.frame.x=(322)
frame.frame.y=(0)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0003)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name. This might be a string like (egs. DiscoDancer,Äù).
frame.symbolName=(driver_runCycle_side)
8) The current frame number.
frame.frameNumber=(3)
2) The location of the sprite within the sprite sheet image includes the x and y pixel offset as well as the width and height.
frame.frame.x=(0)
frame.frame.y=(246)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0004)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name. This might be a string like (egs. DiscoDancer,Äù).
frame.symbolName=(driver_runCycle_side)
8) The current frame number.
frame.frameNumber=(4)
2) The location of the sprite within the sprite sheet image includes the x and y pixel offset as well as the width and height.

frame.frame.x=(161)
frame.frame.y=(246)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0005)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name. This might be a string like (egs. DiscoDancer,Äù).
frame.symbolName=(driver_runCycle_side)
8) The current frame number.
frame.frameNumber=(5)
2) The location of the sprite within the sprite sheet image includes the x and y pixel offset as well as the width and height.
frame.frame.x=(322)
frame.frame.y=(246)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0006)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name. This might be a string like (egs. DiscoDancer,Äù).
frame.symbolName=(driver_runCycle_side)
8) The current frame number.
frame.frameNumber=(6)
2) The location of the sprite within the sprite sheet image includes the x and y pixel offset as well as the width and height.
frame.frame.x=(0)
frame.frame.y=(492)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0007)
frame.symbol=([object SymbolItem])
9) The name/label of the current frame in the animation sequence (egs. 'Jump', 'Walk', 'Dance', etc,À¶).
frame.symbol.timeline.layers[0].frames[frame.frameNumber].name=(WalkCycle)
7) The name of the animation sequence. This is sometimes called the symbol name. This might be a string like (egs. DiscoDancer,Äù).
frame.symbolName=(driver_runCycle_side)
8) The current frame number.
frame.frameNumber=(7)
2) The location of the sprite within the sprite sheet image includes the x and y pixel offset as well as the width and height.
frame.frame.x=(161)
frame.frame.y=(492)

frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0008)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name. This might be a string like (egs. DiscoDancer‚Äù).
frame.symbolName=(driver_runCycle_side)
8) The current frame number.
frame.frameNumber=(8)
2) The location of the sprite within the sprite sheet image includes the x and y pixel offset as well as the width and height.
frame.frame.x=(322)
frame.frame.y=(492)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetinSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0009)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name. This might be a string like (egs. DiscoDancer‚Äù).
frame.symbolName=(driver_runCycle_side)
8) The current frame number.
frame.frameNumber=(9)
2) The location of the sprite within the sprite sheet image includes the x and y pixel offset as well as the width and height.
frame.frame.x=(0)
frame.frame.y=(738)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0010)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name. This might be a string like (egs. DiscoDancer‚Äù).
frame.symbolName=(driver_runCycle_side)
8) The current frame number.
frame.frameNumber=(10)
2) The location of the sprite within the sprite sheet image includes the x and y pixel offset as well as the width and height.
frame.frame.x=(161)
frame.frame.y=(738)
frame.frame.w=(161)
frame.frame.h=(246)

3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(frameExport method start)
1) A unique frame identifier created by the application.
frame.id=(driver_runCycle_side0011)
frame.symbol=([object SymbolItem])
9) The name/label of the current frame in the animation sequence (egs. 'Jump', 'Walk', 'Dance', etc,Ä¶).
frame.symbol.timeline.layers[0].frames[frame.frameNumber].name=(WalkCycle)
7) The name of the animation sequence. This is sometimes called the symbol name. This might be a string like (egs. DiscoDancer,Äù).
frame.symbolName=(driver_runCycle_side)
8) The current frame number.
frame.frameNumber=(11)
2) The location of the sprite within the sprite sheet image includes the x and y pixel offset as well as the width and height.
frame.frame.x=(322)
frame.frame.y=(738)
frame.frame.w=(161)
frame.frame.h=(246)
3) The x and y offset of the actual location relative to the physical location within the sprite. This is necessary when the sprite is trimmed.
frame.offsetInSource.x=(0)
frame.offsetInSource.y=(0)
4) The physical size of the entire animation sequence (commonly called the frame size). This is useful when for rasterizing the sprite in the correct location.
frame.sourceSize.w=(161)
frame.sourceSize.h=(246)
5) Is the sprite rotated
frame.rotated=(false)
6) Is the sprite trimmed. Trimmed means that the frame of the image has been reduced such that full vertical and horizontal lines of transparent pixels are not included in the edges of the image. Transparent means that the alpha channel is such that you can see the background of the page behind the pixels (usually an alpha of zero).
frame.trimmed=(false)
frame.registrationPoint.x=(102.85)
frame.registrationPoint.y=(110.1)
frame.frameSource=([object SymbolItem])
*(frameExport method end)
-(endExport method start)
meta.autoSize=(true)
meta.sheetWidth=(512)
meta.sheetHeight=(1024)
meta.algorithm=(basic)
meta.shapePadding=(0)
meta.borderPadding=(0)
meta.allowRotate=(false)
meta.allowTrimming=(false)
meta.stackDuplicateFrames=(false)
meta.layoutFormat=(debug.plugin)
meta.canShapePad=(true)
meta.canBorderPad=(true)
meta.canRotate=(false)
meta.canTrim=(true)
meta.canStackDuplicateFrames=(true)
meta.overflowed=(false)
meta.app=(Adobe Flash CS6)
meta.version=(12.0.0.481)
meta.image=(driver_runcycle_demo.png)
meta.format=(RGBA8888)
*(endExport method end)

What is claimed is:

1. A method for extending capabilities of a sprite sheet generation engine (SSGE) for generating a sprite sheet based on sprite sheet format information, the method comprising:
   at the SSGE, receiving code and a set of ordered images from one or more data resources, wherein the code includes the sprite sheet format information;
   at the SSGE, creating an instance of a code type manager that corresponds to the sprite sheet format information;
   at the SSGE, employing the instance of the code type manager to load the code, create an instance of the code, and manage the instance of the code; and
   at the SSGE, extending an operation of the SSGE by employing the instance of the code, a communication mechanism between the SSGE and the instance of the code, and the set of ordered images to generate a sprite sheet including a format corresponding to the sprite sheet format information.

2. The method of claim 1, wherein the loading is performed by a host that is capable of finding or creating images, animation sequence information, and sprite sheet generation parameters.

3. The method of claim 1, wherein the loading is performed by an authoring application.

4. The method of claim 1, further including providing a plug-in architecture for the SSGE, wherein the plug-in architecture creates the communication mechanism between the SSGE and the instance of the code.

5. The method of claim 1, wherein the code includes a plug-in created at a computing device.

6. The method of claim 2, wherein the animation sequence information is ordered at a computing device and rasterized into an image sequence on a time line at the computing device.

7. The method of claim 4, wherein the plug-in architecture includes one or more Application Program Interfaces (APIs) to query at least one of the one or more data resources.

8. The method of claim 1, further including presenting a user interface at a computing device, the user interface having one or more of features including at least one of a selectable indicator or an editable indicator, and at least one of the features being enabled or disabled based on one or more values returned by one or more Application Program Interfaces (APIs) that are employed to guide a user of the user interface in generating the sprite sheet.

9. The method of claim 1, wherein the instance of the code is an instance of a plug-in that corresponds to a plug-in type created at a computing device and is based on the sprite sheet format information, wherein the instance of the code type manager is an instance of a plug-in type manager of the plug-in type, wherein the instance of the plug-in type is managed by the plug-in type manager, and the plug-in type manager is managed by an overall plug-in manager that further manages detecting the code included in the one or more data resources, loading the detected code, and calling one or more Application Program Interfaces (APIs) included in at least one of the one or more data resources.

10. A system comprising:
one or more processors;
a memory having instructions for a host module, wherein when the instructions are executed by at least one processor of the one or more processors extend capabilities of a sprite sheet generation engine (SSGE) for generating a sprite sheet based on sprite sheet format information by at least partially causing operations to be performed, the operations comprising:
over a computer network, receiving code and a set of ordered images from one or more data resources, wherein the code includes the sprite sheet format information;
employing the host module to create an instance of a code type manager that corresponds to the sprite sheet format information;
employing the instance of the code type manager to load the code, create an instance of the code, and manage the instance of the code;
extending an operation of the SSGE by employing the instance of the code, a communication mechanism between the SSGE and the instance of the code, and the set of ordered images to generate a sprite sheet such that the sprite sheet includes a format that corresponds to the sprite sheet format information; and
providing, over the computer network, the generated sprite sheet to a client computing device.

11. The system of claim 10, the operations further comprising finding or creating images, animation sequence information, and sprite sheet generation parameters.

12. The system of claim 10, wherein the host module is an authoring application.

13. The system of claim 10, the server computing device further including a plug-in architecture, wherein the plug-in architecture creates the communication mechanism between the SSGE and the instance of the code.

14. The system of claim 10, wherein the code includes a plug-in created at the client computing device.

15. The system of claim 11, wherein the animation sequence information is ordered and rasterized into an image sequence on a time line.

16. The system of claim 13, wherein the plug-in architecture includes one or more Application Program Interfaces (APIs) to query at least one of the one or more data resources.

17. The system of claim 10, the memory having additional instructions for a plug-in management module, wherein when the additional instructions are executed by the at least one processor of the one or more processors, cause plug-in management operations to be performed, the plug-in management operations comprising:
providing, by way of the computer network, a user interface at the client computing device, wherein the user interface having one or more features including at least one of a selectable indicator or an editable indicator, and at least one of the features being enabled or disabled based on one or more values returned by one or more Application Program Interfaces (APIs) that are employed to guide a user of the user interface to generate the sprite sheet.

18. The system of claim 10, wherein the instance of the code is an instance of a plug-in that corresponds to a plug-in type based on the sprite sheet format information, the instance of the code type manager is an instance of a plug-in type manager of the plug-in type, and the memory having additional instructions for a plug-in management module, wherein when the additional instructions are executed by the at least one processor of the one or more processors, cause plug-in management operations to be performed, the plug-in management operations comprising:
employing the instance of the plug-in type manager to manage the instance of the plug-in that corresponds to the plug-in types, each type managed by a plug-in type manager, and
employing an overall plug-in manager to manage the plug-in type manager, detecting the code included in the one or more data resources, loading the detected code, and calling one or more Application Program Interfaces (APIs) included in at least one of the one or more data resources.

19. A machine-readable non-transitory storage device having embedded therein a set of instructions which, when executed by a machine, extend capabilities of a sprite sheet generation engine (SSGE) for generating a sprite sheet based on sprite sheet format information by causing execution of operations comprising:
loading code and a set of ordered images into the SSGE from one or more data resources, the code comprising one or more plug-ins of one or more types and the sprite sheet format information, wherein the set of ordered images are rasterized into an image sequence on a time line;
providing a plug-in architecture, the plug-in architecture creating a communication mechanism between the SSGE and each of the one or more plug-ins of the one or more types; and
extending an operation of the SSGE by using each of the one or more plug-ins, the communication mechanism between the SSGE and each of the one or more plug-ins, and the set of ordered images to generate a sprite sheet such that the sprite sheet includes a format that corresponds to the sprite sheet format information, wherein extending the operation of the SSGE further uses one or more managing plug-ins of the one or more types, such that each of the one or more plug-ins of a particular type of the one or more types is managed by a particular managing plug-in of the one or more managing plug-ins of a corresponding type of the one or more types, and
each of the one or more managing plug-ins of the one or more types is managed by an overall managing plug-in that further manages detecting the code included in the one or more data resources, loading the detected code, and calling one or more Application Program Interfaces (APIs) included in at least one of the one or more data resources.

* * * * *